United States Patent [19]

Shieh

[11] 3,930,174

[45] Dec. 30, 1975

[54] STATOR AND ARMATURE FOR A VIBRATING MOTOR

[75] Inventor: Ming K. Shieh, Westerville, Ohio

[73] Assignee: Dresser Industries, Inc., Dallas, Tex.

[22] Filed: Apr. 8, 1974

[21] Appl. No.: 458,653

[52] U.S. Cl. .......................... 310/29; 198/220 DC
[51] Int. Cl.² ........................................ H02K 33/02
[58] Field of Search ............ 310/43, 28, 29, 27, 21, 310/22; 198/220, 220 DC

[56] References Cited
UNITED STATES PATENTS

| | | | |
|---|---|---|---|
| 2,458,545 | 1/1949 | Weyandt | 310/29 |
| 3,167,670 | 1/1965 | Spurlin | 310/29 |

FOREIGN PATENTS OR APPLICATIONS

| | | | |
|---|---|---|---|
| 1,125,694 | 3/1962 | Germany | 310/29 |

Primary Examiner—Donovan F. Duggan
Attorney, Agent, or Firm—John M. Lorenzen

[57] ABSTRACT

A vibrating motor having a main frame and a center clamp with vibrator bars interposed between the main frame and the center clamp. The main frame and the center clamp vibrate relatively to each other, with the main frame being the relatively heavier element so that the principal vibration is that of the center clamp and the working element that is secured to the center clamp. There is a stator in the main frame and an armature in the center clamp disposed opposite each other with a small air gap. The stator is periodically excited to attract and to release the armature which results in the vibration of the center clamp and the working element. The stator is encapsulated in a housing that is mounted in the main frame, and the armature is encapsulated in a housing that is formed in the center clamp. Each of the stator housing and the armature housing is formed with an opening through which the encapsulating material is poured into the housing around the stator and the armature, respectively, and hardens to securely hold the stator and the armature in the respective housing.

2 Claims, 9 Drawing Figures

STATOR AND ARMATURE FOR A VIBRATING MOTOR

BACKGROUND OF THE INVENTION

1. Field of the Invention

This invention relates to vibrating motors, and more particularly to a novel construction of a stator and armature for vibrating motors.

2. Description of the Prior Art

The vibrating motors to which this invention relates are characterized by a main frame and a center clamp with a stack of vibrator bars interposed between the main frame and the center clamp. The opposite ends of the vibrator bars are fixedly secured to the main frame, and the center clamp is fixedly secured to the vibrator bars at a position intermediate the opposite ends thereof. The stack of vibrator bars secured in this manner to the main frame and to the center clamp constitutes the flexible element in the vibrating motor which permits the relative vibratory movement of the main frame and the center clamp.

In the main frame there is a stator which is an electromagnet that is alternately energized and deenergized to be periodically excited. In the center clamp there is an armature that is disposed opposite the stator with a small air gap between the stator and the armature. When the stator is energized, during onehalf period of magnetic excitation, the armature and the center clamp are drawn toward the stator, flexing the vibrator bars in the direction of the stator. When the stator is de-energized, during the other half period when the stator is not magnetically excited, the armature and the center clamp are released from the magnetic force, whereby the vibrator bars spring back and flex in the opposite direction. Such alternate flexing action of the spring bars produces the vibration of the main frame and the center clamp relatively to each other.

In a typical construction of the vibrating motor, the main frame is made as the heavy element, which is relatively heavier than the center clamp and the working part to which the center clamp is attached. A typical use of a vibrating motor is for a vibrating feeder in which there is a feeding trough attached to the center clamp, and this feeding trough, with the material that is in the trough, then becomes part of the vibrated mass.

It has been customary to make such vibrating motors of flat laminations which are stacked to form the stator and the armature. In the stator, each of the flat laminations has a horseshoe configuration to form two poles in the stator, and an electrical coil is mounted on each pole. A sufficient number of the laminations is stacked to form the stator to the desired thickness, and these are then secured by a plurality of through bolts which extend through the laminations to secure these together in the stator, it being desired that such laminations lay flat against each other in abutting relation. The through bolts also secure the stator to the main frame.

The armature has similarly been formed of a plurality of flat laminations which are of an elongated form to extend across the two poles of the stator. The armature has been formed of a stack of such laminations of sufficient number to form the armature of the same thickness as the stator. The armature laminations are secured by a plurality of through bolts which extend through the laminations to hold them in the assembly tightly stacked against each other in abutting relation. The through bolts also secure the armature to the center clamp.

Such a typical construction of a vibrating motor is illustrated in the patent to Flint, U.S. Pat. No. 2,094,785, issued Oct. 5, 1937, for Vibratory Conveyor. In the vibrating motor which is illustrated in this patent, the mode of operation is that the coils which are on the poles of the stator are alternately energized and de-engergized thereby periodically magnetically to excite the stator. The stator laminations are made of magnetically permeable material, and the stator is alternately magnetized and de-magnetized as the coils are energized and de-energized, respectively. The armature is separated from the poles of the stator by a small air gap, and is formed of laminations made of magnetically permeable material. As the stator is magnetized the armature is drawn toward the stator poles, and when the stator is de-magnetized the armature is released, thereby producing the vibrating action of the motor by the vibrator bars which are interposed between the main frame and the center clamp.

In such vibrating motor construction, the respective through bolts in the stator and in the armature are relied upon to hold the laminations of the stator and of the armature in assembled abutting relation in the main frame and in the center clamp, respectively. This construction requires that the laminations be in as near flat condition as possible to maintain the close abutting relation of the laminations in order to produce the best operation that is possible with this type of construction. However, it is possible for the laminations to become slightly separated in the course of vibration which causes noise and losses in the magnetic operation of the stator, with a resulting loss of efficiency of operation. Another drawback is that there are eddy currents generated in the through bolts by reason of the encircling magnetic flux, thereby generating heat and causing losses in the operation of the stator and the armature.

In another typical construction, welding along the edges of the laminations is relied upon to hold the laminations of the stator and of the armature in assembled abutting relation in the main frame and in the center clamp, respectively. Such a construction diminishes the effectiveness of the laminations and increases the eddy current losses.

SUMMARY OF THE INVENTION

In accordance with this invention, there is a housing for the stator and a housing for the armature, with the stator and the armature being contained within the respective housings and securely held therein. The stator is formed with the usual horseshoe configuration to provide a pair of poles, and there is an electrical coil mounted on each pole. The coils are alternately energized and de-energized to correspondingly magnetize and de-magnetize the stator. The armature is placed opposite the stator with a small air gap separating the armature from the poles of the stator, and the armature is alternately drawn toward the stator and released from the stator as the latter is alternately magnetized and de-magnetized by the periodic excitation. The housings for the stator and for the armature face each other with open ends through which the stator and the armature face each other and are disposed opposite each other with the air gap between the poles of the stator and the armature.

The stator is encapsulated in its housing, which is to say that there is encapsulating material filling the housing around the stator, but leaving the poles of the stator exposed at the open end of the housing. Such encapsulating material is rigid and by filing the housing around the stator and its coils effectively firmly secures the stator within the housing, such that it is held in fixed position in the stator housing. The armature is similarly firmly held in its housing by encapsulating material which surrounds the armature, but leaves the end of the armature exposed at the open end of the armature housing so as to face the poles of the stator. This encapsulating material effectively prevents any movement of the stator or armature within their respective housings, thereby retaining the most efficient operating condition of the stator and armature. Although it is known to encapsulate elements such as the stator, this invention provides a new construction of encapsulated stator and armature for a vibrating motor.

A preferred encapsulating material is an epoxy resin which is poured into the respective housing around the stator and around the armature, and this material then hardens within the respective housing to firmly hold the stator and the armature. Each of the housings for the stator and for the armature is provided with an opening at the top thereof opposite the open end of the housing through which the encapsulating material may be poured into the housing to completely surround the stator and the armature, as the case may be. During such pouring of the epoxy resin into the housing, the open end of the latter is closed, for example, by a flat Teflon plate laying across such open end, thereby to contain the epoxy material within the limit of the plane of the open end of the housing. When the epoxy resin has solidified, the Teflon plate may be removed from the open end of the housing and this leaves the poles of the stator exposed at the open end of its housing, and similarly leaves the face of the armature exposed at the open end of its housing, to lie opposite each other and separated by a small air gap.

It is an object of this invention to provide an improved vibrating motor in which the stator and the armature are firmly held in position opposite each other.

It is another object of this invention to provide an improved vibrating motor in which the stator and the armature are each firmly held in a housing opposite each other with a small air gap separating the stator and the armature.

It is a further object of this invention to provide an improved vibrating motor in which the stator and the armature are firmly held by encapsulating material to prevent any movement of the stator and the armature from their assembled position.

It is also an object of the instant invention to provide an improved vibrating motor in which the stator is firmly held in its position and means is provided to prevent any separation of the elements of the stator.

It is another object of the invention to provide an improved vibrating motor in which the armature is firmly held by means to prevent separation of elements of the armature.

It is still a further object of the invention to provide an improved vibrating motor in which the eddy current losses of the stator and the armature are minimized.

It is still another object of the invention to provide an improved vibrating motor in which the stator and the armature each can be easily assembled in a housing and firmly held in the housing in a fixed position.

It is yet another object of the invention to provide an improved vibrating motor in which the stator and the armature each can be easily assembled in a housing by an encapsulating material which surrounds the stator and the armature each in its respective housing, and firmly holds each of the stator and the armature in fixed position in its housing.

It is still a further object of the invention to provide an improved vibrating motor in which the stator is firmly held in a housing and the armature is firmly held in a housing and each of the housings is provided with an opening through which encapsulating material may be poured into the housing to surround the stator and the armature, respectively, to solidify therein and to firmly hold the stator and the armature in their assembled positions.

Other objects of the invention will appear hereinafter, the novel features and combinations being set forth in the appended claims.

DESCRIPTION OF THE PREFERRED EMBODIMENT

Figure 1:
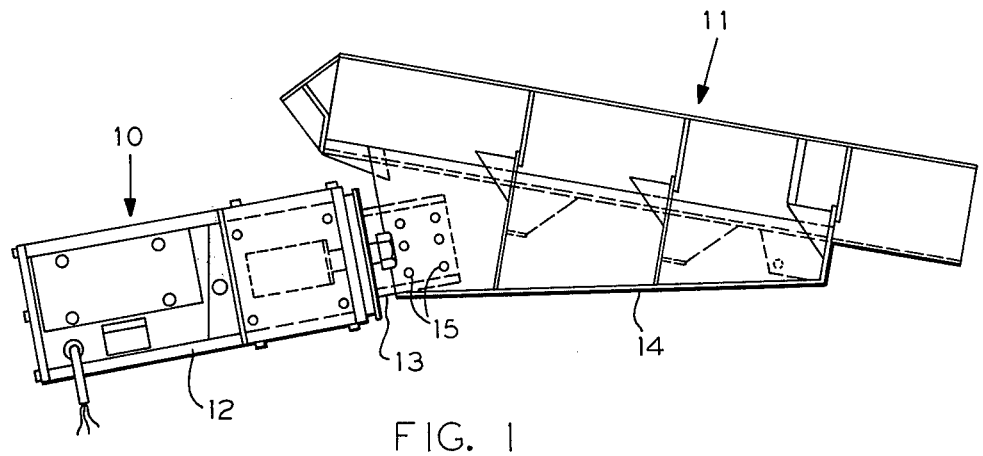
FIG. 1 is a side elevational view of a vibrating feeder which includes a vibrating motor attached to a feeding trough.

There is illustrated in FIG. 1 a vibrating feeder comprising a vibrating motor 10 and a feeding trough 11. The vibrating motor 10 has a main frame 12 and a center clamp 13, the latter being secured to the feeding trough 11. There is a sub-frame 14 on the underside of the feeding trough 11, and the center clamp extends into the sub-frame 14 and is secured to the latter by a plurality of bolts 15, 15.

Figure 2:
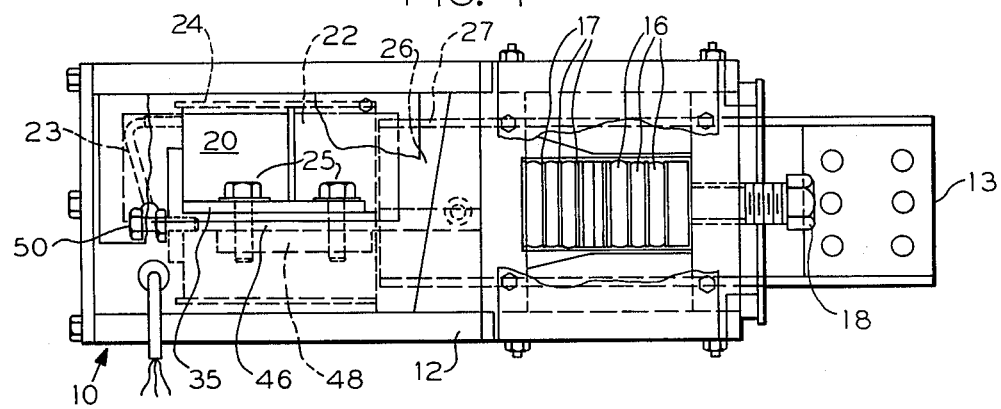
FIG. 2 is a side elevational view of the vibrating motor of FIG. 1 with the side of the vibrating motor being partially open.
Figure 3:
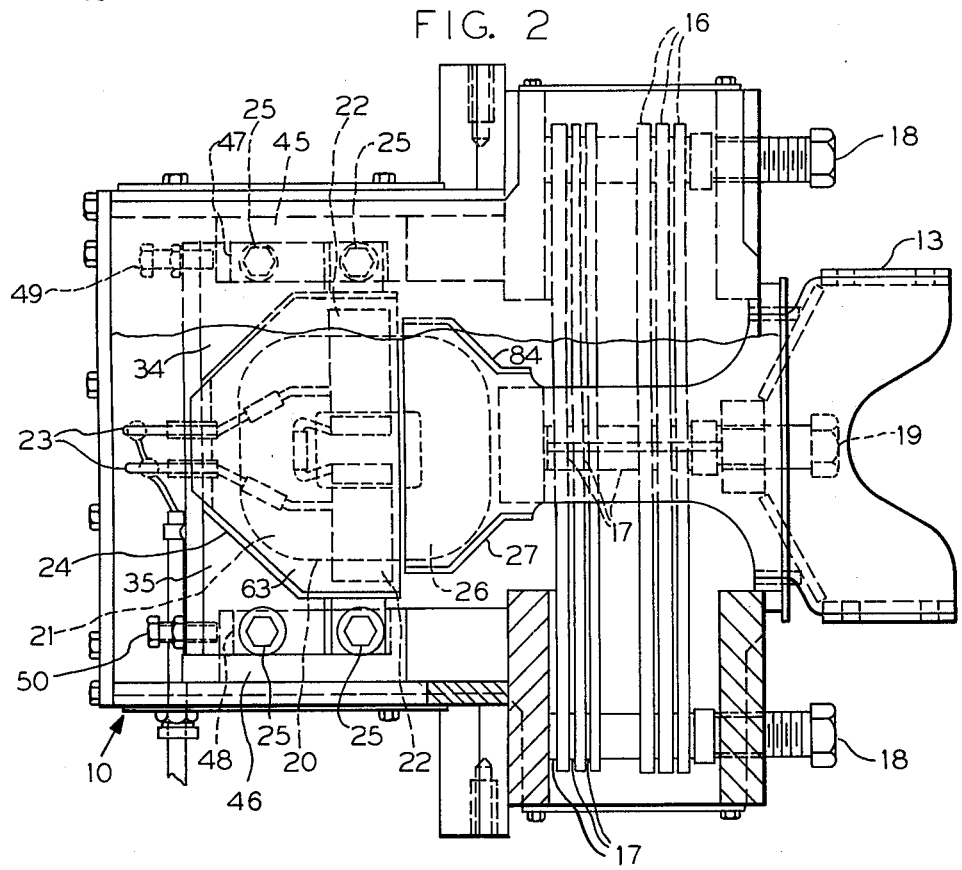
FIG. 3 is a plan view of the vibrating motor illustrated in FIG. 2 with the top of the vibrating motor being partially open.

There is a more detailed illustration of the vibrating motor 10 in FIGS. 2 and 3. The main frame 12 and the center clamp 13 are connected by a plurality of vibrator bars 16, 16, which are arranged in a stack with suitable spacer elements 17, 17 between the individual vibrator bars 16, 16. The spacer elements 17, 17 provide suitable spacing between the individual vibrator bars 16, 16 to permit these to flex back and forth to provide the vibrating action of the main frame 12 and the center clamp 13 relatively to each other.

The opposite ends of the vibrator bars 16, 16 are fixedly secured in the main frame 12 by locking screws 18, 18 at opposite sides of the main frame 12. The center clamp 13 is secured to the stack of vibrator bars 16, 16 at a position midway between the ends thereof, and the center clamp 13 is fixedly secured to the vibrator bars 16, 16 by a locking screw 19 with suitable spacer elements 17, 17 therebetween.

In the main frame 12 there is a stator 20 which comprises a core 21 made of magnetically permeable material, and coils 22, 22 on the poles of the core 21. The coils 22, 22 are alternately energized to magnetize the core 21 of the stator 20, and de-energized to de-magnetize the core 21 and the stator 20. Current is supplied to the coils 22, 22 through electrical leads 23, 23. The stator 20 is contained within a housing 24 that is secured in the main frame 12 by a plurality of bolts 25, 25 on opposite sides of the main frame 12.

The center clamp 13 has an armature 26 which is disposed opposite the stator 20 with a small air gap therebetween. The armature 26 is made of magnetically permeable material so as to be attracted to the stator 20 when it is magnetized and released from the stator 20 when it is de-magnetized. The armature 26 is disposed within a housing 27 formed at the rear end of the center clamp 13.

When the armature 26 is attracted to the stator 20, the vibrator bars 16, 16 are flexed in the direction of the stator 20. When the armature 26 is released from the stator 20 the vibrator bars 16, 16 are free to flex in the opposite direction. Such alternate action of the stator 20 and the armature 26 produces the back and forth flexing movement of the vibrator bars 16, 16 in the vibrating motor 10. This, in turn, produces the relative vibrating movement of the main frame 12 and the center clamp 13. The main frame 12 is made as a relatively heavier element than the center clamp 13, whereby the principal vibrating movement manifests itself in the center clamp 13 and the working element which is attached to the latter, which may be a feeding trough 11 of a vibrating feeder. By the vibrating movement of the feeding trough 11 the material which is delivered to the feeding trough 11 is regularly fed along the length thereof and discharged from the open end of the feeding trough 11.

Figure 4:
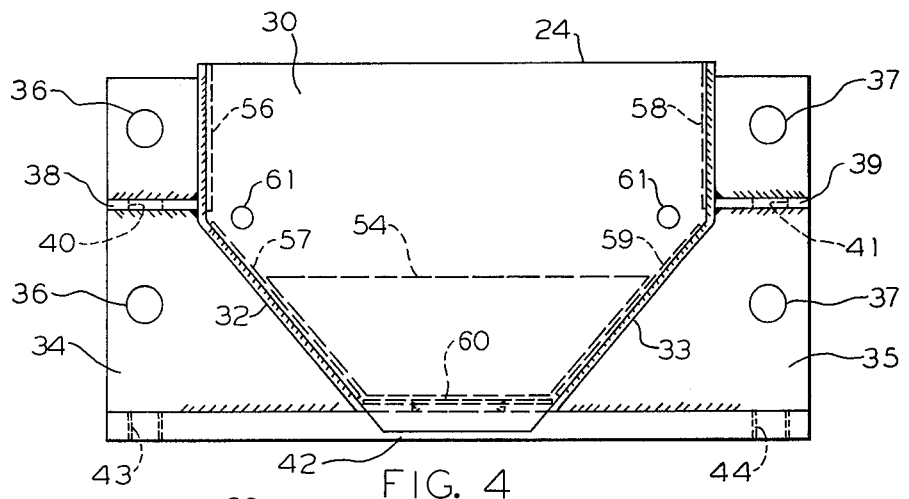
FIG. 4 is a plan view of the stator housing.
Figure 5:
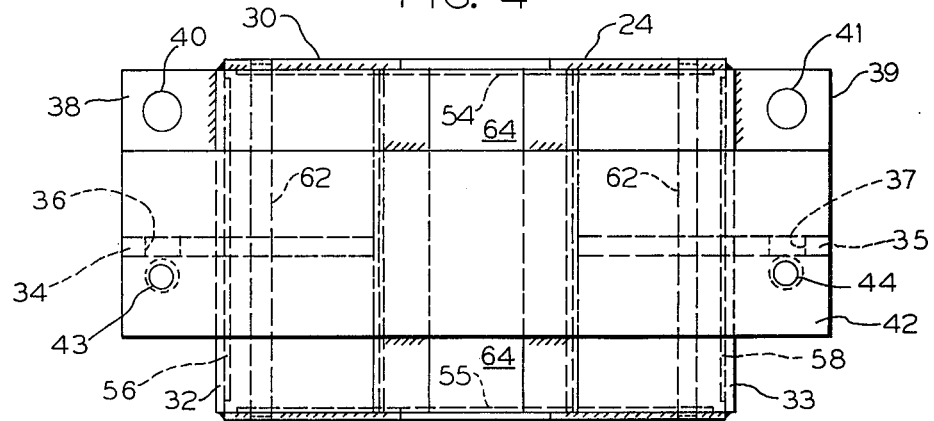
FIG. 5 is an elevational view of the stator housing illustrated in FIG. 4.

The stator housing 24 is illustrated in FIGS. 4 and 5. As will be described hereinafter, the housing 24 is made of a plurality of metal plate members which are assembled with each other and secured to each other by welding, as illustrated in the drawings, to form the housing 24 as a rigid part for containing and firmly holding the stator 20 therein. The stator housing 24 has upper and lower cover plates 30, 31, which are alike. There are side plates 32, 33 which are bent to conform to the shape of the cover plates 30, 31. The cover plates 30, 31 are disposed in alignment with each other and in spaced disposition, with the side plates 32, 33 being disposed at opposed sides of the stator housing 24 adjacent to the cover plates 30, 31 to be welded to the latter. The cover plates 30, 31 and the side plates 32, 33 form the container part of the housing 24 within which the stator 20 is disposed.

Ribs 34, 35 are cut to fit the respective side plates 32, 33 and are secured to the latter by welding. The rib 34 is formed with a pair of holes 36, 36, and the rib 35 is formed with a pair of holes 37, 37. The respective holes 36, 36 and 37, 37 are spaced from each other, for the reception of the bolts 25, 25 by which the housing 24 is secured to the main frame 12. Midway between the pair of holes 36, 36 there is a lifting lug 38 secured to the rib 34 and the adjacent side plate 32, and a lifting lug 39 secured to the rib 35 and the adjacent side plate 33, by welding the parts to each other. The lifting lug 38 is formed with a hole 40, and the lifting lug 39 is formed with a similar hole 41 for the attachment of hooks or other means by which the stator housing 24 may be lifted and moved from place to place, or for assembly in the main frame 12.

At the top of the housing 24 there is a back plate 42 which extends across the side plates 32, 33 and the ribs 34, 35, and is secured to the side plates 32, 33 and to the ribs 34, 35 by welding. Threaded holes 43, 44 are tapped in the opposite ends of the back plate 42 for a purpose to be described hereinafter.

Referring to FIGS. 2 and 3, the main frame 12 has shelves 45, 46 at opposite sides which extend inwardly to support the stator housing 24. The ribs 34, 35 overlie the shelves 45, 46, respectively. The bolts 25, 25 extend through the rib 34 and through the shelf 45 and are threaded into plate 47 under the shelf 45. Similarly, the bolts 25, 25 at the other side of the main frame 12 extend through the rib 35 and through the shelf 46 and are threaded into a plate 48 that lies under the shelf 46. By tightening the respective bolts 25, 25 the plates 47, 48 are drawn up against the underside of the respective shelves 45, 46 and securely hold the stator housing 24 in adjusted position. The shelves 45, 46 are formed with elongated holes for the bolts 25, 25 so that there is some adjustment available of the position of the stator housing 24 by sliding the latter along the shelves 45, 46. A bolt 49 is threaded into the hole 43, and a bolt 50 is threaded into the hole 44 in the back plate 42. The bolts 49, 50 extend through the back plate 42 and abut the edges of the shelves 45, 46 and are used for adjusting the position of the stator housing 24 along the shelves 45, 46. The adjustment of the position of the stator housing 24 is used for setting the width of the air gap between the stator 20 and the armature 26. The magnetic force of the stator 20 on the armature 26 is a function of the air gap therebetween.

The stator 20 is held within the housing 24 by encapsulation therein. Several pieces of expanded metal are secured to the inside of the housing 24 for the purpose of anchoring the encapsulating material. There are two pieces of expanded metal 54, 55, which lay against the cover plates 30, 31, respectively, and are tack welded to the latter. There are also two pieces of expanded metal 56, 57, which lay against the side plate 32 and are tack welded thereto, and two similar pieces of expanded metal 58, 59, which lay against the side plate 33 and are tack welded to the latter. At the top of the stator housing 24 there is another piece of expanded metal 60 which is tack welded to the ends of the side plates 32, 33. The several pieces of expanded metal 54 to 60 provide surfaces for engagement by the encapsulating material to anchor the latter within the stator housing 24. In addition, there are holes 61, 61 in each of the cover plates 30, 31 through which there extend the threaded rods 62, 62, each of which is at a position that is clear of the stator 20. The threaded rods 61, 61 provide another means of anchoring the encapsulating material within the housing 24.

To assemble the stator 20 and the stator housing 24 these parts are laid on a flat Teflon plate with the poles of the stator core 21 on such plate and the coils 22 mounted on the poles, and the housing 24 is also laid on such plate over the stator 20 with the open end of the housing being in down position. The encapsulating material 63 is then poured into the housing 24 to completely surround the stator 20. For this purpose there is an opening 64 that is formed between the cover plate 30, the ends of the side plates 32, 33 and the back plate 42, and a similar opening 64 at the bottom of the stator housing 24 formed between the cover plate 31, the ends of the side plates 32, 33 and the back plate 42.

Figure 6:
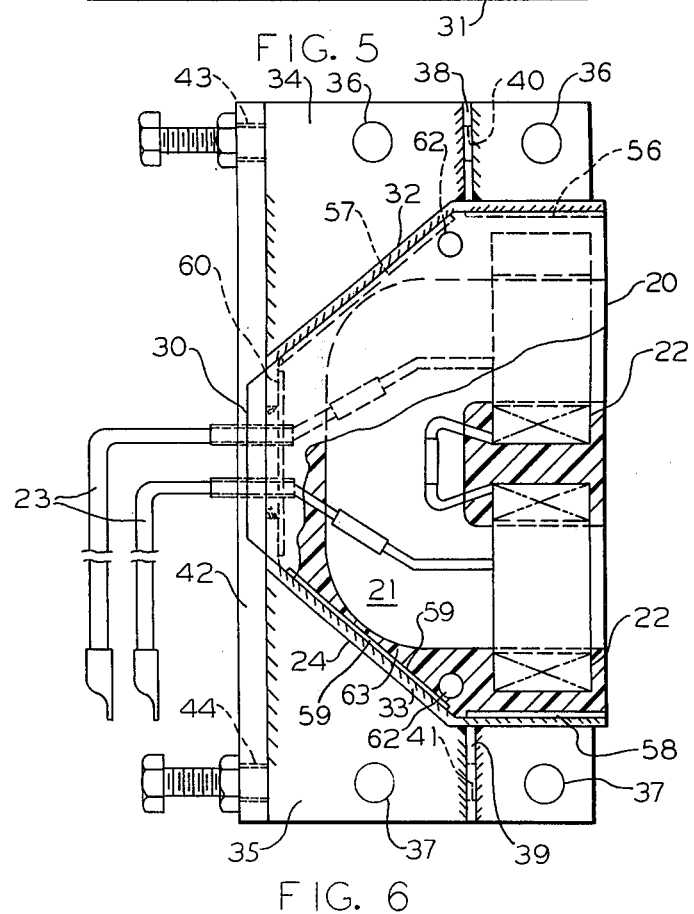
FIG. 6 is a section veiw in plan of the stator housing with the encapsulated stator.

The encapsulating material 63 may be an epoxy resin of a thermosetting type which can be poured through the openings 64, 64 into the stator housing 24 to completely surround the stator 20. The epoxy resin then hardens and securely holds the stator 20 in the stator housing 24 as illustrated in FIG. 6, with the poles of the core 21 being located in the plane of the open end of the stator housing 24. This establishes a planar surface from which the air gap between the stator 20 and the armature 26 is measured.

Figure 7:
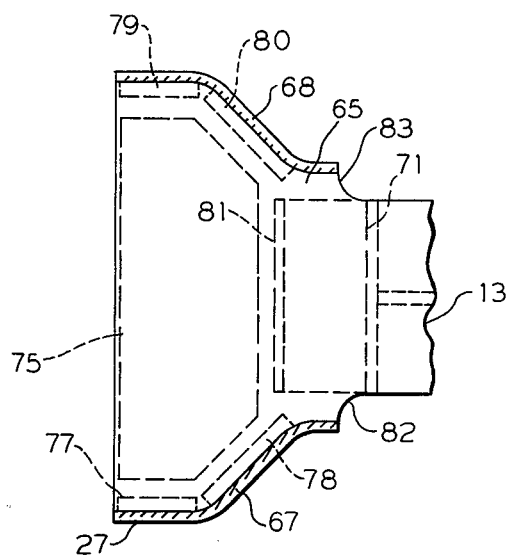
FIG. 7 is a plan view of the armature housing.
Figure 8:
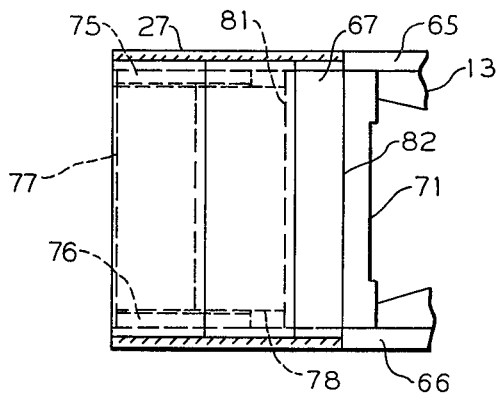
FIG. 8 is an elevational view of the armature housing illustrated in FIG. 7.

The armature housing 27 if formed in the rear end of the center clamp 13 and is illustrated in FIGS. 7 and 8. The center clamp 13 has upper and lower plate members 65, 66, which are of the same shape and are disposed one above the other in spaced disposition. There are side plates 67, 68, which are bent to fit against the upper and lower plate members 65, 66. These parts are formed of metal to be welded to each other to form the armature housing 27. The container part of the armature housing 27 is formed between the upper and lower plate members 65, 66 and the side members 67, 68. The center clamp also has the seat 71 for the vibrator bars 16 which is disposed between the upper and lower plate members 65, 66 and also is secured in place by welding to the plate members 65, 66.

The armature 26 is secured within the armature housing 27 by encapsulating material 84 that fills the housing 27 around the armature 26. Several pieces of expanded metal are secured in the housing 27 to anchor the encapsulating material 84. There are two similar pieces of expanded metal 75, 76, of the same shape, which are secured to the upper and lower plate members 65, 66, respectively, by tack welding these in place. There are two pieces of expanded metal 77, 78 which are secured to the inside of the side plate 67, and two similar pieces of expanded metal 79, 80 which are secured to the inside of the side plate 68, by tack welding. There is still another piece of expanded metal 81, which is secured to the seat 71 by welding. The several pieces of expanded metal 75 to 81 provide surfaces for anchoring the encapsulating material in the housing 27.

Figure 9:
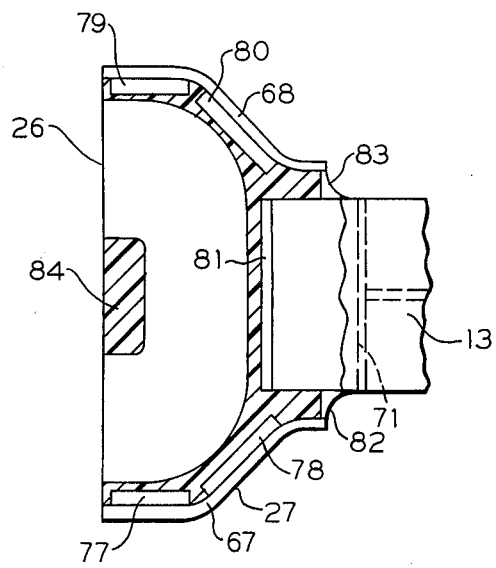
FIG. 9 is a sectional view in plan of the armature housing with the armature encapsulated therein.

There is an opening 82 in the top of the armature housing 27 that is formed between the upper and lower plate members 65, 66 and the side plate 67 and the seat 71. There is a similar opening 83 formed between the upper and lower plate members 65, 66 and between the side plate 68 and the seat 71. The openings 82, 83 provide access to the inside of the armature housing 27 for pouring the encapsulating material 84 into the housing 27 to fill the latter around the armature 26 as illustrated in FIG. 9. The encapsulating material 84 locks on the several pieces of expanded metal 75 to 81 and also fills the space around the seat 71 to provide a further anchor for holding the encapsulating material 84 in the housing 27.

In filling the armature housing 27 with the encapsulating material 84 the armature 26 is set on a Teflon plate and the armature housing 27 is set over the armature 26 with the parts accurately positioned relatively to each other. The Teflon plate covers the open end of the armature housing 27 to contain the encapsulating material 84 therein as it is poured into the housing 27. The encapsulating material 84 is then poured in through the openings 82, 83 to fill the housing 27 around the armature 26. The encapsulating material 84 may be an epoxy resin of the thermosetting type which sets up and hardens in the housing and securely locks on the several pieces of expanded metal 75 to 81 to be securely held in the housing 27 and to firmly hold the armature 26 in the housing 27. A planar surface is set up at the open end of the armature housing 27 with the ends of the armature lying in this planar surface. The air gap that is formed between the stator 20 and the armature 26 is measured to this planar surface.

By the construction which is described herein, the stator 20 is firmly secured in the stator housing 24, and the armature 26 is firmly secured in the armature housing 27. Each of the stator housing 24 and the armature housing 27 is filled with encapsulating material which surrounds the stator 20 and the armature 26, respectively, to firmly secure these elements in their housings. The encapsulating material is securely locked to the respective housings 24, 27 so that the whole becomes a rigid assembly to prevent any movement of the stator 20 in its housing 24 or of the armature 26 in its housing 27. This permits the stator 20 and the armature 26 to be accurately aligned, and the air gap to be accurately set between these elements.

Obviously, those skilled in the art may make various changes in the details and arrangements of parts without departing from the spirit and scope of the invention as defined by the claims hereto appended, and applicant, therefore, wishes not to be restricted to the precise construction herein disclosed.

Having thus described and shown an embodiment of the invention, what it is desired to secure by Letters Patent of the United States is:

1. A vibrating motor comprising: a stator housing having an open end lying generally in a plane; a stator disposed in the stator housing and having an end flush with the open end of said stator housing; means for providing periodic electrical excitation of the stator; an armature housing movably connected to the stator housing and having an open end lying generally in a plane parallel to and spaced from the open end of said stator housing; and an armature disposed in the armature housing and having an end flush with the open end of said armature housing opposite the end of the stator such that periodic excitation of the stator produces a reciprocating movement of the armature and armature housing due to the periodic magnetic attraction and release of said armature, wherein both the stator and the armature are held in their respective housings by a hardened encapsulating material filling their respective housing flush to the open ends and surrounding all of the stator and armature except for their opposed polar ends and further including pieces of expanded metal secured to the walls of said housings to form an anchor for the encapsulating material.

2. A vibrating motor comprising: a stator housing having an open end lying generally in a plane; a stator disposed in the stator housing and having two pole faces flush with and exposed in the open end of said stator housing; means for providing periodic electrical excitation of the stator; an armature housing movably connected to the stator housing and having an open end lying generally in a plane parallel to and spaced from the open end of said stator housing; and an armature disposed in the armature housing and having two pole faces flush with and exposed in the open end of said armature housing opposite the pole faces of the stator such that periodic excitation of the stator produces a reciprocating movement of the armature and armature housing due to the periodic magnetic attraction and release of said armature, wherein both the stator and the armature are held in their respective housings by a hardened encapsulating material filling their respective housings flush to the open ends and surrounding all of the stator and armature except for their opposed polar ends.

* * * * *